(12) United States Patent
Doron et al.

(10) Patent No.: US 11,381,593 B2
(45) Date of Patent: Jul. 5, 2022

(54) SYSTEM AND METHOD FOR PROVIDING INSIGHTS ON DISTRIBUTED DENIAL OF SERVICE ATTACKS

(71) Applicant: RADWARE, LTD., Tel Aviv (IL)

(72) Inventors: Ehud Doron, Moddi'in (IL); Yotam Ben Ezra, Ra'anana (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 239 days.

(21) Appl. No.: 16/216,335

(22) Filed: Dec. 11, 2018

(65) Prior Publication Data
US 2019/0182291 A1 Jun. 13, 2019

Related U.S. Application Data

(60) Provisional application No. 62/597,215, filed on Dec. 11, 2017.

(51) Int. Cl.
| | | |
|---|---|---|
| G06F 11/00 | (2006.01) |
| G06F 12/14 | (2006.01) |
| G06F 12/16 | (2006.01) |
| G08B 23/00 | (2006.01) |
| H04L 9/40 | (2022.01) |

(52) U.S. Cl.
CPC .... H04L 63/1458 (2013.01); *H04L 2463/142* (2013.01)

(58) Field of Classification Search
CPC ............. H04L 63/1441; H04L 63/1458; H04L 2463/141; H04L 2463/142; H04L 2463/143
See application file for complete search history.

(56) References Cited

U.S. PATENT DOCUMENTS

| | | | | |
|---|---|---|---|---|
| 2005/0091513 A1* | 4/2005 | Mitomo | ............... | H04L 63/1408 713/188 |
| 2014/0096251 A1* | 4/2014 | Doctor | ................ | H04L 63/1408 726/23 |
| 2016/0205120 A1* | 7/2016 | Marek | ................. | H04L 63/1458 726/23 |
| 2017/0063917 A1* | 3/2017 | Chesla | ................... | H04L 63/20 |

OTHER PUBLICATIONS

Claude Fachkha, Elias Bou-Harb and Mourad Debbabi, "On the inference and prediction of DDoS campaigns", Wireless Communications and Mobile Computing, Wirel. Commun. Mob. Comput. 2015; 15:1066-1078, Published online Aug. 6, 2014 in Wiley Online Library (Year: 2014).*

* cited by examiner

*Primary Examiner* — Amie C. Lin
(74) *Attorney, Agent, or Firm* — M&B IP Analysts, LLC

(57) ABSTRACT

A system and method for generating insights on distributed denial of service (DDoS) attacks are provided. The method includes receiving a plurality of data feeds from a plurality of data sources; processing the plurality of received data feeds to generate enriched data sets; and analyzing the enriched data sets to generate insights information about a DDoS attack that have been participated in at least one DDoS attack.

20 Claims, 5 Drawing Sheets

SYSTEM AND METHOD FOR PROVIDING INSIGHTS ON DISTRIBUTED DENIAL OF SERVICE ATTACKS

CROSS-REFERENCE TO RELATED APPLICATIONS

This application claims the benefit of U.S. Provisional Application No. 62/597,215 filed on Dec. 11, 2017, the contents of which are hereby incorporated by reference.

TECHNICAL FIELD

The present disclosure relates generally to cyber security, and more specifically to providing insights with respect to DDoS attacks occurring in a network.

BACKGROUND

In recent years, carriers, telephone companies, Internet service providers, and other service providers utilizing large scale networks have been suffering from devastating denial of service (DoS) and distributed DoS (DDoS) attack campaigns. DoS attackers typically have two major objectives: 1) to overwhelm various parts of the service provider's infrastructure to interfere with connectivity and the ability to deliver the required set of services; and 2) to attack services and end points to disrupt their services or functionalities. Because service providers seek to provide high speed and reliable services, frequent DoS attacks may significantly affect business, as customers become dissatisfied with poor service performance.

Moreover, enterprises themselves, particularly medium and large enterprises, seek to protect their networks and systems from DoS attacks, as such attacks can hinder or completely stop normal business operations.

In order to protect their online assets, organizations have deployed a variety of security devices and services (collectively referred to as security devices or a security device). Each such security device typically generates a large number of events. An event may include, for example: an indication on detection of an attack and various details of the detected attack, a breach of a security policy, a detection of suspected behavior, and so on. Due to the high volume of security events and their complexity resulting from advanced applications and networks, a security administrator in an organization cannot manually process and analyze the generated events in an effective manner.

Some techniques for mitigating DoS attacks include inline attack detection and mitigation involving deploying a detector inline of traffic flows within an environment. The detector is configured to detect attacks based on traffic received at the detector and directed at another system, or service, in the environment. Other techniques for mitigating DoS attacks include out of path (OOP) attack detection and mitigation. When an attack is detected based on deviations from normal traffic flows, the attack traffic may be diverted to a "scrubbing center" configured to clean the attack traffic and redirect the cleaned traffic to the original destination. The attack detector can be deployed on premises, or as software as a service (SaaS) in the cloud.

As opposed to inline detection, OOP detection does not require deploying a detector inline of traffic flows. However, although OOP detection offers some convenience in this regard, OOP detection techniques tend to detect and mitigate less efficiently and accurately than inline detection techniques. As one example: OOP detectors respond to DoS and DDoS attacks slower than their inline counterparts.

Anomaly detection involves learning "normal" behavior to identify anomalous behavior. Anomaly detection may face challenges in efficiently collecting and analyzing data, particularly when larger and more complicated systems, or networks, are involved. On top of that, only very basic information about the attack is provided along with the attack indication. The common attack attributes provided by existing attack detection and mitigation systems, include an attack bandwidth, packets per second, and an IP address of the target and source of the attacker. Thus, information security operations centers (SOCs) and network operations centers (NOC) teams need to "manually" investigate Flow, and other, data in order to find more detailed attack attributes that are needed for optimal mitigation. Even when events are manually analyzed, such analysis is generally inaccurate, cumbersome, and impractical. In addition, SOC/NOC teams do not receive any kind of alerts or indication about future attacks and, therefore, are not able to prepare for anticipated future needs. Further, no true insights are available on ongoing DDoS attacks.

Over time, cyber-attackers have developed increasingly sophisticated techniques for disrupting target systems and services. One example of increasing sophistication of cyber-attacks is the rise of attack campaigns in which multiple attacks, from various types and volumes, are utilized to exploit security weaknesses. In particular, a series of different types of attacks may be utilized to reveal and exploit vulnerabilities over time. These attacks can be executed using "common" attack tools that are free and simply available on the Internet.

A major challenge in defending against sophisticated attack techniques is efficiently utilizing security resources in order to optimize security and cost while abiding by best practices for mitigation. Specifically, the sophistication and high number of attacks that NOC and SOC teams confront on a daily basis is challenging. The human resources needed to defend against these attacks are not sustainable, and existing automated solutions do not sufficiently anticipate and address future stages of attacks. As a result, operating defenses against modern attacks is a heavy burden for network and application decision makers.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating insights on distributed denial of service (DDoS) attacks. The method comprises receiving a plurality of data feeds from a plurality of data sources; processing the plurality of received data feeds to generate enriched data sets; and analyzing the enriched data sets to generate insights information about a DDoS attack that have been participated in at least one DDoS attack.

Certain embodiments disclosed herein include a system a system for generating insights on distributed denial of service (DDoS) attacks comprising: a processing circuitry; and a memory, the memory containing instructions that, when executed by the processing circuitry, configure the system to: receiving a plurality of data feeds from a plurality of data sources; processing the plurality of received data feeds to generate enriched data sets; and analyzing the enriched data sets to generate insights information about a DDoS attack that have been participated in at least one DDoS attack.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
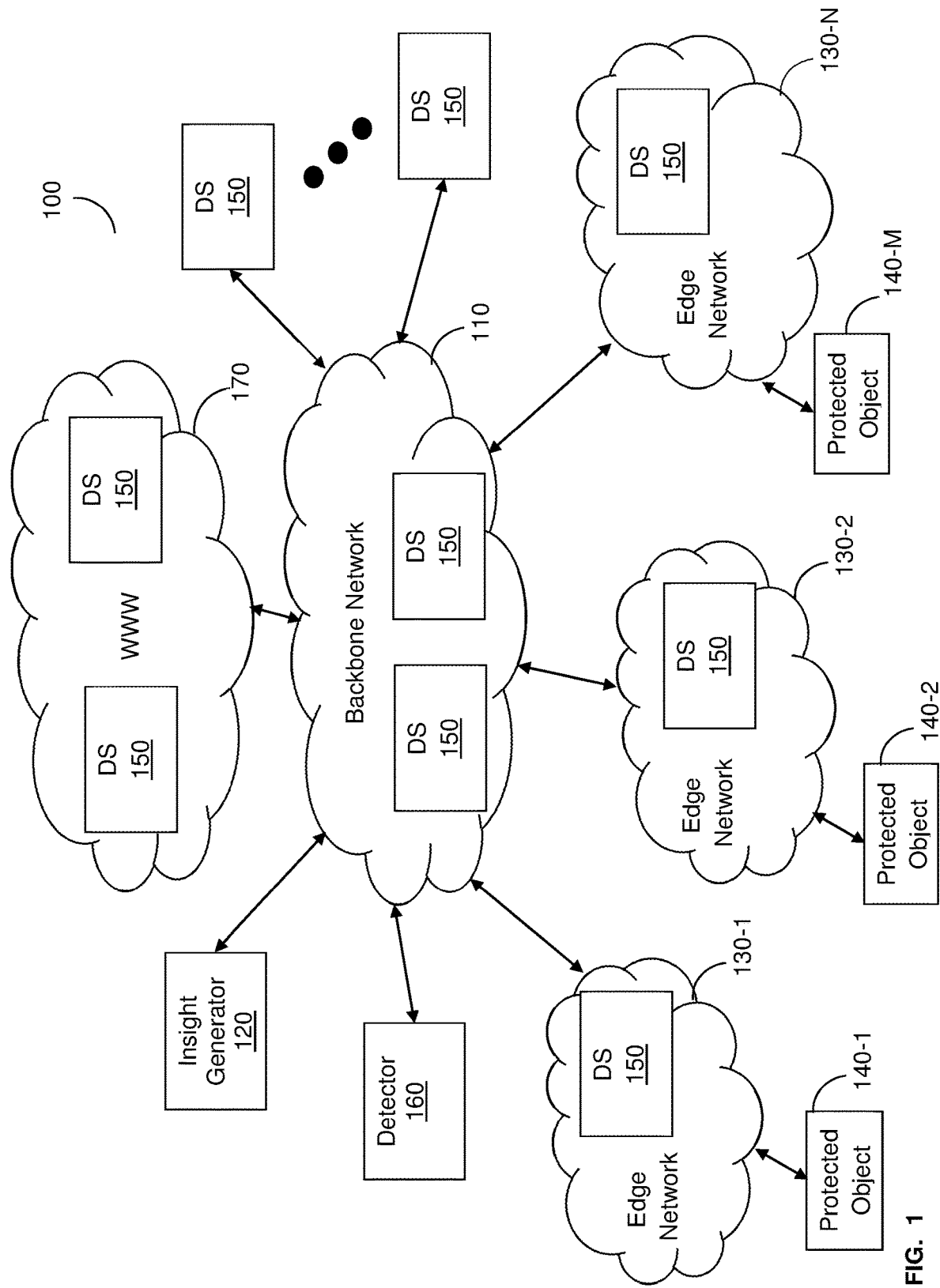
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing insights on distributed denial of service (DDoS) attacks. The insights may be provided by an analytics engine, and may be generated using machine learning techniques. Specifically, the machine learning techniques may be utilized to, for example, properly match events data to actual users or services, classify policy attributes, detect anomalies, and the like. The analytics engine may be implemented as, for example, part of an insights generator that is deployed out of path (OOP) of traffic flows.

Insights generated according to the various disclosed embodiments include, but are not limited to, attack insights, threat insights, and environment insights. In an embodiment, multiple layers of insights including attack, threat, and environment insights are provided, thereby allowing for accurate attribute determination and attribution of security events and, thus, for accurately providing information about the detected attacks for successfully operating the mitigation of the detected DDoS attacks. Such accurate attributions further allow for more rapid effective responses to developing threats. Specifically, the different layers of the insights may relate to different layers of attacks such as, but not limited to: a single attack, an attack campaign, and the like. Additionally, the insights may incorporate events data from all security applications within a network as well as enrichment data to allow deeper understanding of on-going attacks.

Attack insights include comprehensive knowledge and information about attacks and may include: attack indications, attributes, attributions, associations, risks, statuses, and other information about particular attacks. Thus, an attack insight may indicate an isolated attack, and provide deeper understanding on the specific attack.

Threat insights include information about clusters or a sequence of attacks of past and present attack campaigns that are directed to specific sets of customers, Internet Protocol (IP) addresses, subnets, or other entities, and may include sets of insights for threats in an environment. Specifically, each threat insight includes the cooperative information about a cluster of attacks of an attack campaign. Thus, each threat insight may indicate deeper understanding about all attacks within one or more ongoing attack campaigns.

Threat insights include cooperative knowledge and information about threats, or attack campaigns, and may include threat indications, attributions, associations, risks, statuses, and other cooperative information about the threat. Thus, an attack insight may indicate an isolated attack, and provide deeper understanding on the specific attack.

Environment insights include information about attacks and threats that are currently active in the environment and may include sets of insights for currently active attacks and threats in various parts of the environment or in other environments. Thus, each environment insight may provide a global view, in the environment perspective, of all attacks related to a group of attacks directed at an environment as a whole, as opposed to only attacks directed at specific components of the environment. The main objective is to learn the influence of attacks on the infrastructure. Example environments may include, but are not limited to: networks such as mobile networks, subscriber networks, enterprise networks, SP networks, and the like. The environment insights may be generated for specific networking elements (e.g., a router, a switch, and so on), a region within the environment (e.g., a sub-network), a mobile network, a subscriber network, an enterprise network, and a service provider network as a whole and so on. The insights may include total amounts of attack traffic, a type of attack part, attack sources, and so on as they appear in the environment perspective.

The insights provided according to the disclosed embodiments allow for accurately attributing security events to particular attacks and attack campaigns, thereby allowing for more effective mitigation, and its various operational processes. Additionally, the insights may include predictions that allow for the anticipation of the next steps of an attack campaign and for performing mitigation actions for the next steps in the campaign in advance. Thus, the insights provided according to the disclosed embodiments may allow for appropriately customizing defensive measures to proactively detect and mitigate upcoming attacks rather than merely reacting to events after they occur, thus providing security teams with sophisticated information to be used for optimal mitigation, both, and the like. For example, an insight including attack attribution data, may indicate the attack tools that were utilized for an attack campaign, which may allow for more effective mitigation than basic information such as bandwidth, packets per second, and IP addresses.

Some disclosed embodiments further include utilizing techniques for ingestion, enrichment, and storage of data that allow for massively and scalable collection and analysis of high volumes of data from a variety of sources and having a variety of characteristics to generate the required attack insights. Specifically, events data from attack detectors (e.g., Flow data such as NetFlow as well as data from DDoS attack mitigators and detectors), data from attack repositories (e.g., Internet repositories, ERT of an organization, threat intelligence, and so on), Geo IP (e.g. MaxMind, peerDB) and data from other security sources (e.g., Twitter, DarkNet, etc.), may be ingested and enriched, both in batches and in real-time as data is collected. The enrichment is performed using data related to traffic flows and the environments (e.g., networks and systems) receiving, sending, or otherwise interacting with traffic, such as source and destination information.

FIG. 1 shows an example network diagram 100 utilized to describe the various disclosed embodiments. The network 100 includes a backbone network 110 connected to the World Wide Web (WWW) 170 and to a plurality of edge networks 130-1 through 130-N (collectively referred to hereinafter as edge networks 130 or individually as an edge network 130). The backbone network 110 may be operated or maintained by an Internet service provider (ISP) or other service provider, a network carrier, a cloud provider, and the like. The edge network 130 may be a datacenter, an enterprise network, a mobile network, an IoT network, and the like. The edge network 130 allows access to a plurality of computing resources (not shown). Such resources may be accessed by any computing device.

As shown in FIG. 1, a plurality of protected objects 140-1 through 140-N (collectively referred to hereinafter as protected objects 140 or individually as a protected object 140) are connected to the edge networks 130. The protected object 140 may be a tenant, a computing infrastructure, a server or group of servers, services, or a combination thereof. In an example implementation, the protected object 140 is associated with a customer paying for the security services. A protected object 140 may be configured by an IP address for a dedicated server (for example, a single VM) protection, or by a variable size subnet for a network protection (a group of VMs). The protected object 140, in one embodiment, can be the infrastructure (e.g., routers, switches and their network interfaces), a server, or a group of servers, deployed in the backbone network 110, the edge network 130, or both.

According to the disclosed embodiments, a plurality of data sources 150 are deployed in the backbone network 110. Each of the data sources 150 is configured to collect or otherwise stores data related various security event, such as attack indication from security entities, and to traffic within the backbone network 110 and, more specifically, traffic directed to and from the protected objects 140.

In an example embodiment, the data sources 150 are deployed at an edge network 130 and the backbone network 110. The data sources 150 may include various security devices such as detectors and mitigators deployed in the backbone network 110 or any of the edge networks 130, along with several network entities, such as switches, routers and the like. An example for such data source 150 may be a router collecting Flow data (e.g., NetFlow), Border Gateway Patrol (BGP) data, Simple Network Management Protocol (SNMP) data, and the like.

In another example embodiment, the data sources 150 are part of the backbone, and act as the management layer and services of network 110. Example for such sources are systems that provide Remote Authentication Dial-In User Services (RADIUS), DNS services, DHCP services, DPI services, and the like. Additional example data sources 150 may include, but are not limited to, SOCs and NOCs as well as their various databases and BI systems.

In yet another example embodiment, the data sources 150 may be Internet-based services (not deployed in the backbone network 110). Examples for such services include WHOIS, FarSight DNSDB, ShadowServer, Shadan, GeoIP, treat intelligence, and the like. Examples for additional data sources are provided below.

According to the disclosed embodiments, the detector 160 may be utilized as a data source 150. The detector 160 may be deployed in the backbone network 110 or as a service in the cloud. In the example implementation shown in FIG. 1, the detector 160 is an out-of-path (OOP) detector 160. In other implementations, the detector 160 may be an inline detector or mitigator (inline and/or OOP mitigator). The detector 160 is communicatively connected to all of the data sources 150 and is configured to collect data from such sources.

The detector 160 is configured to enrich Flow data (e.g., NetFlow) with data collected from the data sources 150. In an embodiment, based on the enriched Flow data, the detector 160 is configured to detect DDoS attacks against one or more of the protected objects 140. An example implementation of the detector 160 is further discussed in U.S. patent application Ser. No. 16/212,042 described assigned to the common assignee, the contents of which are hereby incorporated by reference.

According to the disclosed embodiments, an insights generator 120 is configured to receive the events data from the detector 160 and generate insights based on the events data. The events data may include DDoS attack indications generated by the detector 160. In an example implementation, the events data may be enriched with supplementary enrichment data received from the plurality of data sources 150. In another embodiment, the insight generator 120 may be configured to receive supplementary data feeds directly from the one or more data sources 150. Examples for supplementary enrichment data are provided below.

The insights generator 120 is configured to utilize machine learning techniques to generate insights such as attack insights, threat insights, and environments insights, as described further herein below. In an example configuration, the detector 160 and the insight generator 120 may be integrated in the same device. In yet another configuration, the insight generator 120 is deployed as a service in the cloud or as a device in the backbone network 110.

It should be noted that the disclosed embodiments may be utilized to generate insights for any or all of the entities shown in FIG. 1. Specifically, any of the edge networks 130, the backbone network 110, or both, may be protected, individually as an environment, or may be protected collectively as part of a larger environment, or both. Additionally, the environments protected according to the disclosed embodiments may equally include environments operated by individual enterprises.

Figure 2:
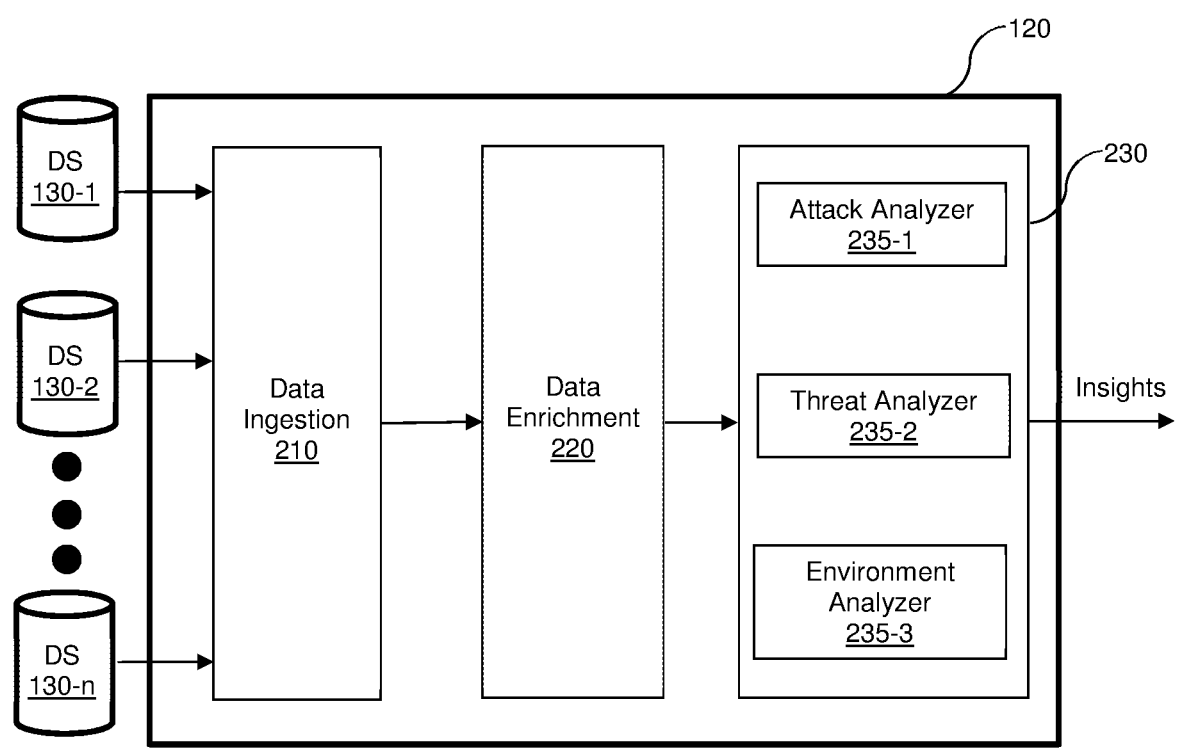
FIG. 2 is a flow diagram illustrating generating insights for DDoS attacks according to an embodiment.

FIG. 2 is an example flow diagram illustrating a process for generating insights by the insight generator 120 according to an embodiment. In an example configuration, data from the data sources 130 is ingested (210) and enriched (220). The ingested and enriched data is provided to an analytics engine 230 including insight generators 235-1 through 235-3.

The data ingestion 210 may include aggregating data collected from the data sources 150. In an example implementation, the data may include, but is not limited to, security events data from detectors (e.g., events data from inline DDoS detectors and mitigators, events data from OOP detectors, and so on), from network entities (e.g., Flow data such as NetFlow, etc.) data about entities behind sources and destination IPs (e.g. application, servers, customer of services hosted by the edge networks 130, mobile or residential subscribers, IoT and other devices, and so on), reputation data from attack repositories or reputation services (e.g., Internet repositories, data from SOC/NOC teams of an organization, etc.), and the like. The sources and destinations can be entities internal to the network, or external (e.g. the Internet); can be the protected entities; can be costumers; can be attackers and so on or the like.

In various embodiments, some data feeds may be utilized as the main data feeds, with other data feeds being used for, e.g., providing additional enrichment information to be used to generate insights. Specifically, the main data feeds include attack events data from various sources like DDoS detectors and mitigators, firewall, SEIM, and the like. The data from the main data feeds may be enriched using data from supplementary enrichment data.

The supplementary enrichment data may include sources of data such as, but are not limited to: Flow data from network entities (e.g., NetFlow), data from SOC and NOCs about attack cases that where handled, data from public attack repositories, attack insights from other customers, networking data (e.g., BGP), DNS data, Geolocation data (e.g., MaxMind), discovery services (e.g., Shodan), Twitter® feeds about attacks, Threat Intelligence, DarkNet intelligence, and the like.

The data may be collected as data streams, as pooled sets of data, as bulk or batch data, or a combination thereof. The collected data is normalized to allow for uniform processing of comparable data from different sources.

The data enrichment 220 may include combining events data with one or more other types of data into an enriched data set. The enriched data set may be stored and processed in real-time as streaming data is collected, or may be stored for subsequent batch processing, or a combination thereof.

In an embodiment, the enriched data sets are provided to the analytics engine 230.

The analytics engine 230 may be configured to generate one or more analytics and corresponding insights. To this end, the analytics engines may be configured to train and apply machine learning models such as classifiers. In an embodiment, the analytics engines 230 may include an attack analyzer 235-1, a threat analyzer 235-2, and an environment analyzer 235-3. In some implementations, partially enriched data sets may be provided to the analytics engine 230, and the analytics engine 230 may be configured to further enrich the partially enriched data sets using the generated analytics, insights, or both.

The attack analyzer 235-1 is configured to generate attack insights based on the enriched events data. The attack insights provide comprehensive knowledge and information about an attack. To this end, the attack insights may include, but are not limited to, predicted attacks, attack monitoring and status indications, attributes, attributions, statuses, associations, risks, and mitigation responses. In an embodiment, the predicted attacks may be determined using machine learning techniques as described further in co-pending U.S. patent application Ser. No. 16/215,878, titled TECHNIQUES FOR PREDICTING SUBSEQUENT ATTACKS IN ATTACK CAMPAIGNS, assigned to the common assignee, the contents of which are hereby incorporated by reference.

The threat analyzer 235-2 is configured to generate threat insights based on the enriched events data. The threat insights provide information about threats currently active in an environment that may be utilized to identify and operate threats in the network. In particular, the threat insights may be utilized as part of a machine learning process to learn threat types and to dynamically identify and operate ongoing threats in an environment. Each threat is a cluster (or portion thereof) of past, present and future attack campaigns directed to a specific set of customers, IP addresses, subnetworks, other entities, or combinations thereof, in an environment.

Thus, the threats may represent sequences of attacks, attack campaigns, both, and the like, that include the past attacks, present on going attacks, and future predictive attacks, all part attack campaign directed and orchestrated by attacks or group of attackers. To this end, the threat insights include sets of insights such as, but not limited to, predicted attacks, attributes, statuses, attributions, associations, risks, mitigation responses, and combinations thereof. Specifically, each set of threat insights includes insights for multiple respective attacks that are part of attack campaign.

The threat insights account for attack patterns with respect to entities, and may therefore contextualize attack insights of individual attacks of each threat. For example, for a DDoS burst attack, threat insights indicating information related to different bursts of attacks may allow for more accurate identification of the type and characteristics of a specific attack and, therefore, appropriate mitigation actions and operations, than attack insights for each individual attack which is part of the burst. As another example, a Mirai DNS flood threat may exhibit different characteristics than other types of flood threats. This knowledge is vastly in the campaign to operations (NOC/SOC) teams in order to successfully and optimally operate the attacks.

The environment analyzer 235-3 is configured to generate environment insights based on the enriched attack events data. The environment insights provide information on attacks currently active in various environments (e.g., environments owned or operated by the same entity). The environment insights include sets of attack insights such as, but not limited to, attributes, statuses, attributions, associations, risks, mitigation responses, and combinations thereof, as they appeared on various environments of the network. Specifically, each set of environment insights includes attack insights for attacks and threats with respect to each environment. The environment insights therefore provide insights about attacks from the perspective of an environment (e.g., SP network, datacenter, enterprise network, etc.) rather than from the perspective of a single attack victim (e.g., a customer system or an IP subnetwork).

Various example attack insights noted above are now discussed in more detail. It should be noted that the attack insights are not limited to the specific examples, and that other attack insights may be equally utilized. The attack monitoring and status indications may include, but are not limited to, type (e.g., TCP Flood, DNS attack, etc.), duration, timelines for BW, packets per second (PPS), trends over time, and the like.

The attack attributes may include, but are not limited to, attacks destinations and their respective identifications (e.g., 1.1.1.1/32, video server, customer identification, services and more), flow attributes for different attack signatures (e.g., TCP port 80, packet size of 99 bytes), origins of attacks within a network (e.g., a router identifier), geographical orientations of attack sources, identifiers of systems originating attacks (e.g., an autonomous system number), identifiers of peer autonomous systems, directions (e.g., incoming, outgoing, etc.), and the like.

The attack attributions indicate information regarding the identity of the source or location of the attackers and may include, but are not limited to, identifiers of attackers (e.g., source IP 123.55.6.122 . . . IoT camera type 22), tools utilized by attackers (e.g., Mirai option 3), type of attack (e.g. Stamp attack) and the like. The attack associations may include, but are not limited to, methods and tools utilized by attackers, similarities to other attacks, the attack groups issued similar attacks and the like. The attack risks may indicate scoring, severity, or both.

In an embodiment, the tools utilized by attackers may be determined using machine learning techniques for learning patterns associated with different types of attack tools or specific attack tools with respect to the enriched data sets. In yet another embodiment, the tools utilized by attackers may be determined using machine learning techniques utilizing attacks data previously detected on protected entities of other tenants or customers.

The determination of the attack attributions may include utilizing the enriched data sets as inputs to a model (e.g., a classifier) trained using enriched data sets and corresponding attack tool labels, where the model outputs a type of attack tool or a specific attack tool.

In an embodiment, the insights from each analyzer 235-1 through 235-3 may include insights categorized with respect to dimensions including visibility, analytics, and actions. The visibility dimension may include attack monitoring, attack status, and attack attributes. The analytics dimension may include attack attributions, associations and risk indicators. The actions dimension may include mitigation actions. An example for such a mitigation action may include diverting or blocking traffic based on traffic attributes and/or predefined rules. A mitigation action may also include triggering or sending alerts.

It should be noted that, while data is enriched at data enrichment 220, in some implementations, data may be enriched at data ingestion 210, by the analytics engine 230, or both.

Figure 3:
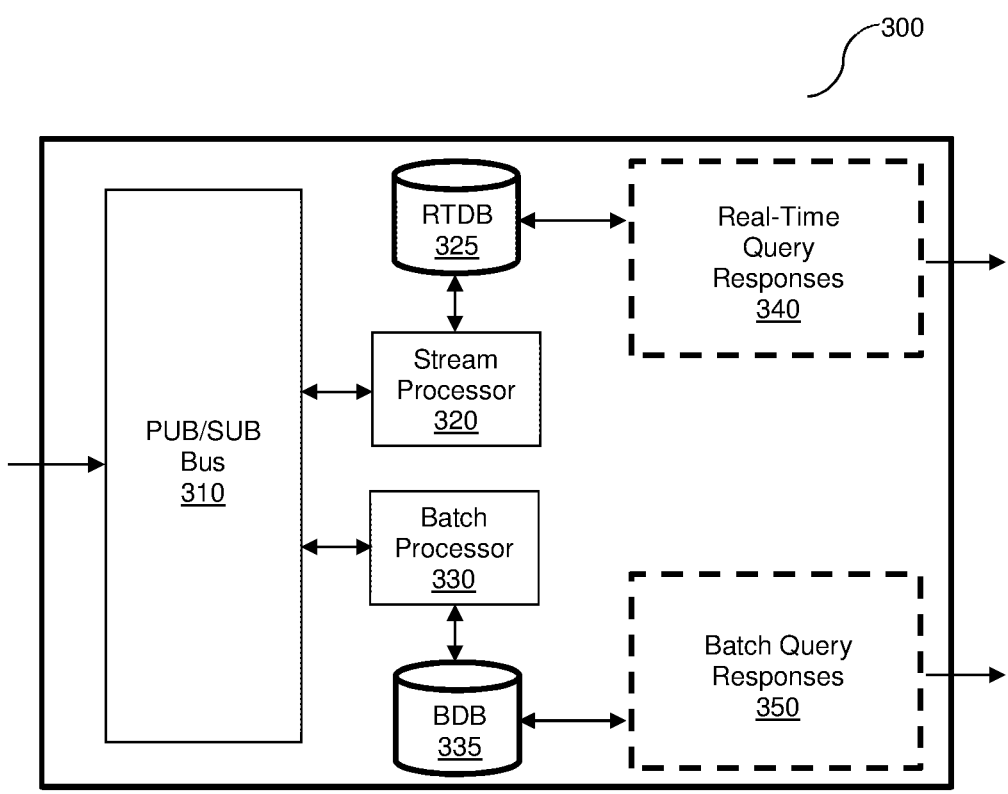
FIG. 3 is a flow diagram illustrating providing enriched data by the DDoS detector according to an embodiment.

FIG. 3 is an example flow diagram 300 illustrating the operation of the insight generator 120 according to an embodiment. In an embodiment, the enrichment may be part of the data enrichment 220 and may include enriching data resulting from the data ingestion 210, FIG. 2.

A publish/subscribe (PUB/SUB) bus 310 is configured to handle ingesting of data feeds (streams) from network and other sources (i.e., the data sources 130) and to distribute the ingested data. The PUB/SUB bus 310 may be a high-performance bus configured for ingesting and distributing high volumes of data.

In an embodiment, data distributed by the PUB/SUB bus 310 may be provided to a stream processor 320 and to a batch processor 330. Due to the variety of data feeds being ingested and utilized as well as the required enrichments and analytics, both stream and batch processing may be utilized.

Stream processing includes real-time data processing and analytics as data is ingested, and allows for immediate detection of abnormal traffic patterns so as to accelerate the subsequent mitigation actions. To this end, the stream processor 320 may include a streaming data processing engine (not shown). In an embodiment, the stream processor 320 is configured to store both raw and processed data in a real-time database (RTDB) 325.

Batch processing includes processing high volumes of data including groups of data each collected over a period of time. To this end, the batch processor 330 may be or may include a big data processing engine (not shown). In an embodiment, the batch processor 330 is configured to store both raw and processed data in a batch database (BDB) 335.

Once data is stored in the RTDB 325 and the BDB 335, the data may be subsequently accessed and utilized for detecting DDoS attacks. In some implementations, real-time query responses may be provided based on data in the RTDB 325, and batch query responses may be provided based on data in the BDB 335. In a further implementation, the responses 340 and 350 may be utilized by, for example, the analysis engines 230.

Figure 4:
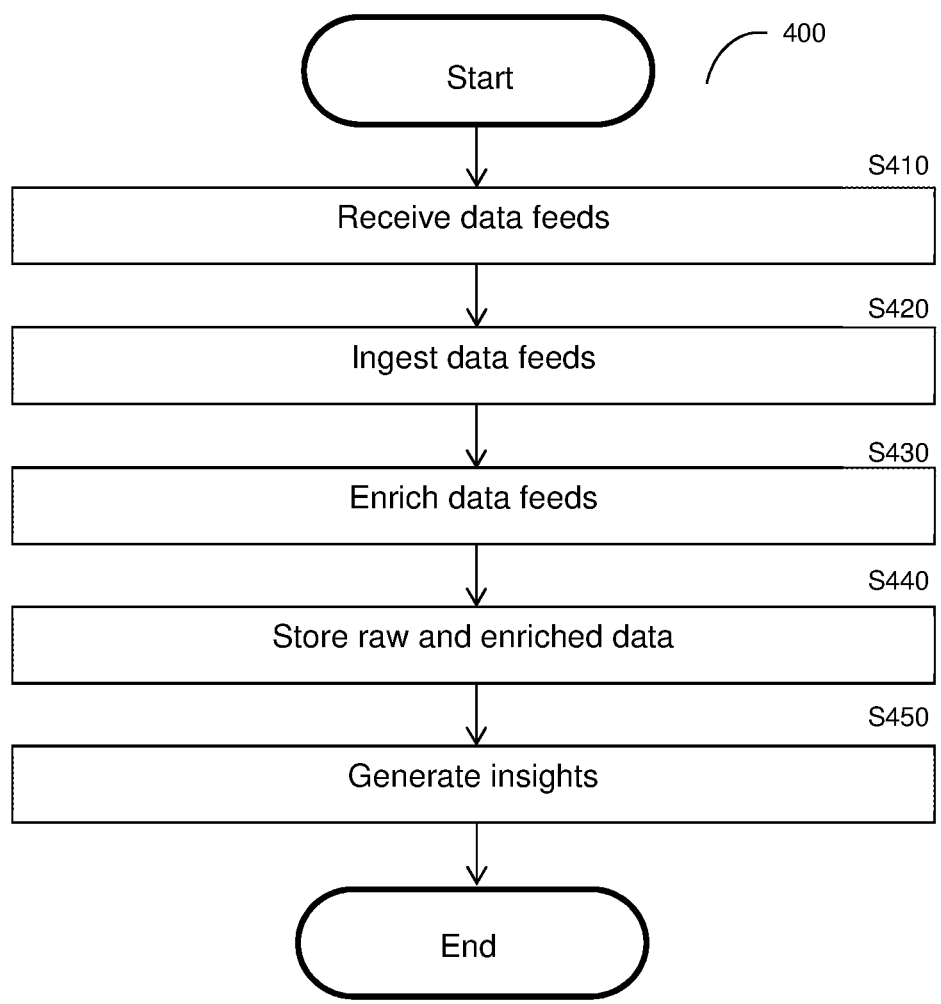
FIG. 4 is a flowchart illustrating a method for generating insights for DDoS attacks according to an embodiment.

FIG. 4 is an example flowchart 400 illustrating a method for generating insights for DDoS attacks according to an embodiment. In an embodiment, the method is performed by the insight generator 120, FIG. 1.

At S410, events and enrichment data is received. The received data includes data related to events, and further include supplementary enrichment data to be used for enriching the events data. The supplementary enrichment data may include, but is not limited to, Flow data (e.g., NetFlow), data from SOC and NOCs, data from attack repositories, and threat intelligence, Border Gateway Patrol (BGP) data, other types of networking data, Simple Network Management Protocol (SNMP) data, data from Remote Authentication Dial-In User Services (RADIUS), Policy and Charging Rules Function (PCRF) data, active domain name service (DNS) queries, DNSFlow, logs, data from Internet sources such as WHOIS, data from FarSight DNSDB, Geolocation data (e.g., MaxMind data), GeoIP data from Layer 7 entities (e.g., FW, ADCs, DPIs, etc.), and the like.

At S420, the received data is ingested. In an embodiment, S420 includes aggregating and normalizing the data to allow for uniform processing of comparable data.

At S430, the ingested data is utilized to create enriched data sets. Each enriched data set includes a portion of the events data and a portion of the supplementary enrichment data. The enriched data sets may include both streaming data sets created in real-time as data is ingested and batch data sets created after data has been collected for a period of time. The data sets may be enriched as described further herein.

At S440, the enriched data sets are stored for subsequent use. In an embodiment, each enriched data set may be stored in a corresponding database (e.g., the RTDB 325 for the enriched streaming data set and the BDB 335 for the enriched batch data set). In a further embodiment, each enriched data set may be stored with a corresponding raw data set including the pre-ingestion and pre-enriched data of each data set. For example, the raw data sets may include events data collected in real-time and during the same period of time as the data of the enriched batch data set. The stored data sets may be utilized for detection, mitigation, or both, of DDoS attacks.

At S450, insights are generated based on the enriched data sets. In an embodiment, S450 includes providing at least a portion of the enriched data to an analysis engine. The analysis engine may include, but is not limited to, an attack insight generator, a threat insight generator, an environment insight generator, and the like. The analysis engine is configured to generate insights indicating information regarding the nature of threats as described herein above with respect to FIG. 2.

In an embodiment, the insights may be categorized with respect to dimensions including visibility, analytics, and actions. The visibility dimension may include attack monitoring, statuses, and attributes. The analytics dimension may include attack attributions, associations and risk indicators. The actions dimension may include mitigation actions.

Figure 5:
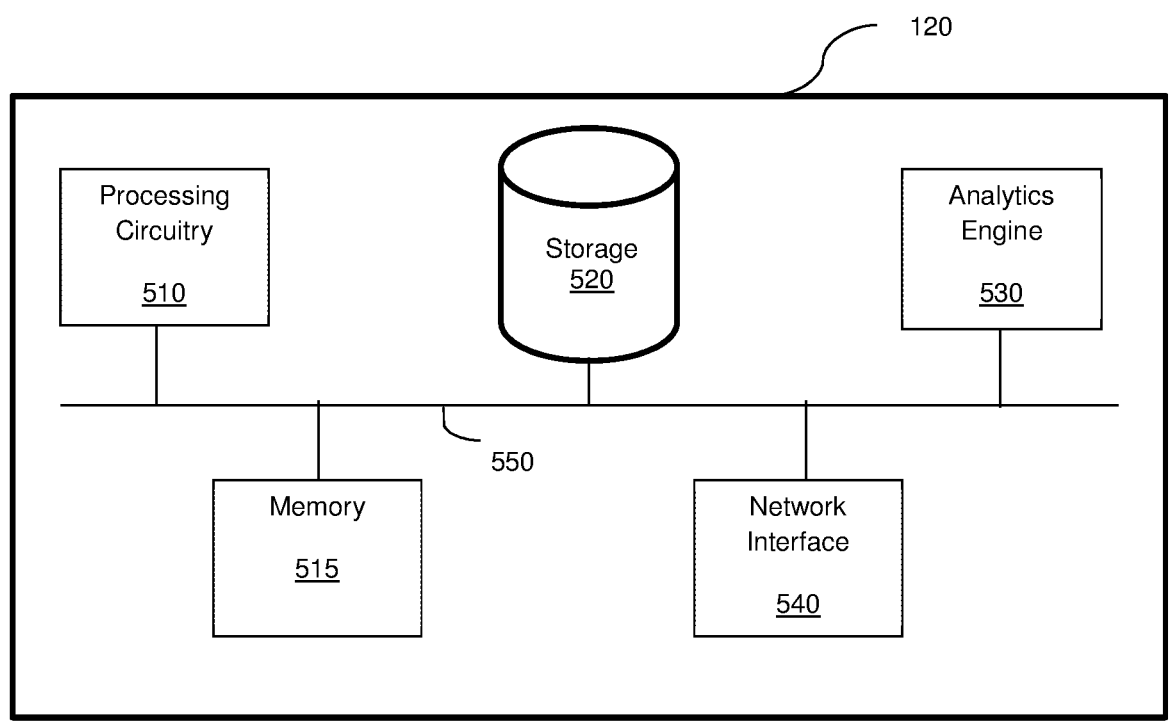
FIG. 5 is a schematic diagram of an insight generator according to an embodiment.

FIG. 5 is an example schematic diagram of the insight generator 120 according to an embodiment. The insight generator 120 includes a processing circuitry 510 coupled to a memory 515, a storage 520, an analytics engine 530, and a network interface 540. In another embodiment, the components of the insight generator 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform the embodiments described herein including generating insights for DDoS attacks.

The storage 520 may be magnetic storage, optical storage, and the like, and may be realized, for example, as flash memory or other memory technology, CD-ROM, Digital Versatile Disks (DVDs), or any other medium which can be used to store the desired information.

The analytics engine 530 is configured to generate insights based on enriched data as described herein. The insights may be utilized for mitigating DDoS attacks. More specifically, the insights indicate information regarding attack campaigns related to attribution of attack campaigns and mitigation of upcoming attacks.

The network interface 540 allows the insight generator 120 to communicate with the data sources 130 for the purpose of, for example, receiving network and traffic data.

It should be understood that the embodiments described herein are not limited to the specific architecture illustrated in FIG. 5, and other architectures may be equally used without departing from the scope of the disclosed embodiments.

It should be noted that various embodiments described herein are discussed with respect to generating insights for DDoS attacks merely for simplicity purposes, and that insights for other types of DoS attacks may be equally generated in accordance with the disclosed embodiments. Additionally, the disclosed embodiments are described with respect to one detector, but may be equally implemented using multiple detectors configured to operate alternatively, or to share the work between them. Further, in some embodiments, the sources of data utilized by different detectors may be different.

The disclosed embodiments may be implemented on-premises of a network, may be implemented remotely (for example as Software-as-a-Service (SaaS), or a combination thereof.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating insights on distributed denial of service (DDoS) attacks, comprising:
   receiving a plurality of data feeds from a plurality of data sources;
   processing the plurality of received data feeds to generate enriched data sets;

analyzing the enriched data sets to generate insights information for a DDoS attack that is part of at least one DDoS attack campaign, wherein the insights information further includes threat insights information about each of the DDoS attacks; and based on the generated insights information, causing a mitigator to perform mitigation of at least the DDoS attack that is part of the at least one DDoS attack campaign.

2. The method of claim 1, wherein the at least one DDoS attack campaign is any one of: a past DDoS attack campaign, an on-going attack campaign, and a future DDoS attack that is part of the at least one DDoS attack campaign.

3. The method of claim 1, wherein the insights information further includes:

attack insights providing information about the DDoS attack, wherein the attack insights include attack status indications, attack attributes, and attack attributions.

4. The method of claim 3, wherein an attack status indication includes any one of: an attack type, an attack duration, an attack bandwidth, and attack trends over time.

5. The method of claim 3, wherein an attack attribute includes any one of: an attack destination, an attack signature, an origin of the DDoS attack within a network, a geographical orientation of an attack source, an attack source, and identity of peer autonomous system, and an attack traffic direction.

6. The method of claim 3, wherein an attack attribution indicates information about an identity of an attacker executing the DDoS attack.

7. The method of claim 3, the insights information further includes:

environment insights providing information about a DDoS attack in an environment perspective.

8. The method of claim 7, wherein the environment insights include attack insights for attacks and threats with respect to network elements and regions within an environment, wherein the environment includes any one of: a router, a switch, a mobile network, a subscriber network, an enterprise network, and a service provider network.

9. The method of claim 1, wherein the mitigation comprises at least handling of packets that are part each DDoS attack that is part of the at least one DDoS attack campaign.

10. The method of claim 1, wherein the threat insights information includes a set of insights about a specific sequence of DDoS attacks within the at least one DDoS attack campaign, the at least one DDoS attack campaign being made up of a sequence of at least two different coordinated DDoS attacks that take place over time, wherein the set of insights include predicted future attacks in the at least one DDoS attack campaign, attributes, statuses, attributions, associations, risks, mitigation responses, and combinations thereof.

11. The method of claim 1, wherein the received plurality of data feeds include attack events data and supplementary enrichment data.

12. The method of claim 11, wherein the supplementary enrichment data is collected from at least one of the plurality data sources, wherein a data source of at least one of the plurality of data sources from which is collected the supplementary enrichment data includes any one of: a reputation service, a detector, a mitigator, and a network entity.

13. The method of claim 1, wherein the method is performed by an insight generator deployed in a backbone network or as a cloud service.

14. The method of claim 1, further comprising:

predicting a next step of at least one DDoS attack within the at least one DDoS attack campaign using the generated insights information, wherein the at least one DDoS attack campaign constitutes a sequence of at least two different coordinated DDoS attacks that take place over time.

15. The method of claim 1, further comprising:

mitigating a next step of at least one DDoS attack within the at least one DDoS attack campaign based on the generated insights information, wherein the at least one DDoS attack campaign constitutes a sequence of at least two different coordinated DDoS attacks that take place over time.

16. The method of claim 1, wherein the at least one DDoS attack campaign constitutes a sequence of at least two different coordinated DDoS attacks that take place over time.

17. A non-transitory computer readable medium having stored thereon instructions for generating insights on distributed denial of service (DDoS) attacks, the instructions when executed by a processor, cause the processor to perform operations comprising:

receiving a plurality of data feeds from a plurality of data sources;

processing the plurality of received data feeds to generate enriched data sets;

analyzing the enriched data sets to generate insights information for a DDoS attack that is part of at least one DDoS attack campaign, wherein the insights information further includes threat insights information about each of the DDoS attacks; and based on the generated insights information, causing a mitigator to perform mitigation of at least the DDoS attack that is part of the at least one DDoS attack campaign.

18. The non-transitory computer readable medium of claim 17, wherein the at least one DDoS attack campaign constitutes a sequence of at least two different coordinated DDoS attacks that take place over time and the mitigation comprises at least handling of packets that are part each DDoS attack that is part of the at least one DDoS attack campaign.

19. A system for generating insights on distributed denial of service (DDoS) attacks, comprising:

a processing circuitry; and a memory, the memory containing instructions that, when executed by the processing circuitry, configure the system to:

receive a plurality of data feeds from a plurality of data sources;

process the plurality of received data feeds to generate enriched data sets;

analyze the enriched data sets to generate insights information for a DDoS attack that is part of at least one DDoS attack campaign, wherein the insights information further includes threat insights information about each of the DDoS attacks; and based on the generated insights information, cause a mitigator to perform mitigation of at least the DDoS attack that is part of the at least one DDoS attack campaign.

20. The system of claim 19, wherein the at least one DDoS attack campaign constitutes a sequence of at least two different coordinated DDoS attacks that take place over time and the mitigation comprises at least handling of packets that are part each DDoS attack that is part of the at least one DDoS attack campaign.

\* \* \* \* \*